United States Patent [19]

Fuchs

[11] Patent Number: 5,715,886
[45] Date of Patent: Feb. 10, 1998

[54] SINGLE USE WELDING MOLD AND METHOD

[75] Inventor: Jean Claude Fuchs, Etrat, France

[73] Assignee: Erico International Corporation, Solon, Ohio

[21] Appl. No.: 752,903

[22] Filed: Nov. 20, 1996

Related U.S. Application Data

[63] Continuation-in-part of Ser. No. 634,668, Apr. 18, 1996, abandoned.

[51] Int. Cl.$^6$ ............................................. B23K 23/00
[52] U.S. Cl. .................................... 164/54; 249/97
[58] Field of Search ........................ 164/54, 53, 108, 164/332, 333, 334, DIG. 12; 249/94, 97

[56] References Cited

U.S. PATENT DOCUMENTS

| | | | |
|---|---|---|---|
| 3,782,677 | 1/1974 | Gelfand | 164/54 X |
| 5,582,228 | 12/1996 | Stidham et al. | 164/54 |

FOREIGN PATENT DOCUMENTS

| | | | |
|---|---|---|---|
| 150188 | 5/1951 | Australia | 164/54 |

*Primary Examiner*—J. Reed Batten, Jr.
*Attorney, Agent, or Firm*—Renner, Otto, Boisselle, Sklar

[57] ABSTRACT

The mold includes a refractory body forming a weld chamber. Exothermic welding material in a crucible above forms molten metal which drops into the weld chamber through a tap hole or open top. The mold includes sleeving passages formed by projecting metal guide tubes extending upwardly at an angle from horizontal to a position above the level of molten metal forming the weld. In this manner, the molten metal is contained within the weld cavity of the mold without packing, adapter sleeves or shims. The guides extend upwardly at an angle from the weld chamber, or as a V with two symmetrical guides. The inside diameters of the guides are larger than normal passages and accordingly accommodate a wide variety of cable sizes without interference with or abrasion of the sleeving passages. This enables one mold to accommodate more sizes, avoids the use of packing, adapter sleeves or shims, and maintains the weld chamber well vented. The mold weld chamber may contain an opening which is closed by an object such as the rod, frame or laminate to which the conductors are welded.

32 Claims, 4 Drawing Sheets

SINGLE USE WELDING MOLD AND METHOD

This application is a continuation-in-part of applicant's application Ser. No. 08/634,668, filed Apr. 18, 1996, and entitled "Single Use Welding Mold and Method", now abandoned.

DISCLOSURE

This invention relates generally as indicated to a single use welding mold and method, and more particularly to a mold and system for making high quality electrical connections more easily and reliably at a lower cost.

BACKGROUND OF THE INVENTION

Exothermic welding is used to make a wide variety of electrical connections. High ampacity low resistance electrical weld connections are usually made with reusable graphite or like material molds and crucibles. Typical of such molds and crucibles are those sold under the well known trademark CADWELD® by Erico International of Solon, Ohio USA. The larger and more complex connections are generally made with the reusable mold systems while some smaller or simple connections are made with a non-reusable or single use disposable mold system sold under the trademark ONE-SHOT®, also by Erico International of Solon, Ohio USA.

The single use mold is made of a frangible refractory material and usually includes a crucible and horizontal sleeves extending into the weld chamber into which the conductors are inserted. Typically the mold with conductor inserted may be placed over a ground rod, for example, and the crucible filled with exothermic weld material which is then ignited. The molten metal formed by the exothermic process welds the conductor to the top of the ground rod. The mold may be left in place or broken away. It is in any event not reusable. Reference may be had to Gelfand U.S. Pat. No. 3,020,608 for an example of such non-reusable mold and system.

One of the major problems with the disposable or single use mold system is that minor changes in cable or conductor sizes, or changes in application require a different size or type of mold. For earthing circuits alone the reusable and non-reusable mold systems require about sixty-five different earthing kits. This presents a logistical problem at many construction sites where a wide variety of earthing connections are to be made. It would be advantageous if the single use molds would accommodate a wide variety of cable sizes and be applicable to different applications thus substantially reducing the parts required while increasing the applications. This would significantly reduce the cost of such high quality electrical connections.

Reusable molds for larger more complex connections are usually two or even three part molds, and are usually opened and closed and held together by toggle clamps. The mold parts have faces which abut at a common parting plane and in which are formed recesses forming the various cavities and passages when the parts are clamped together. Typically the mold parts form a weld chamber and a tap hole which extends from the top of the mold to the weld chamber. The parts to be welded enter the weld chamber through sleeving passages which extend from outside the mold to the weld chamber. Horizontal passages are typically employed when welding cable-to-cable. They may be used in combination with a vertical passage when welding cable to an earthing rod, for example.

A crucible normally sits on top of the assembled mold parts. The crucible includes a chamber holding the exothermic material on top of a fusible disc. A sprue or tap hole below the disc communicates with the top of the tap hole of the mold. When a measured and controlled quantity of exothermic material is ignited, it forms molten metal which fuses the disc, permitting the molten metal to flow downwardly into the weld chamber to weld any parts exposed to the chamber. Any slag forms on top of the weld metal and normally accumulates in a riser. After the weld cools, the mold is disassembled and any slag may be removed. The mold and crucible are cleaned for reuse.

Such molds can be rather intricate and are not insignificant in cost. The number of times a mold can be reused has a very direct impact on the cost of each weld connection. It has been found that the greatest wear on such molds occurs at the sleeving passages. This is particularly true where the sleeving passages accommodate stranded cable which may vary in size. With such cable, sealing material or packing must be employed to prevent the molten metal from leaking. Where the conductor is undersized with respect to the mold sleeving passage, adapter sleeves or shims around the conductors may be employed to fit the sleeving passage, and such may be used in combination with the packing material. All of the above adds to the cost of the weld.

Although it is always recommended to preheat the mold before use to ensure no moisture comes in contact with the molten metal, it can be seen that this is less of a problem if the weld chamber is not sealed, but well vented, especially along the sleeving passages.

For most connections, it is a time consuming job to locate the cable ends properly in the weld chamber beneath the tap hole, all properly sleeved, shimmed or sealed. Cable of considerable length and size is bulky and difficult to handle and keep in one place. This is particularly true where the operator is trying to close the mold parts properly on three cables or two cables and a ground rod, for example. It would be very convenient if the operator could insert the cable ends into an already closed mold, and to a physical stop. It would also be convenient to have a mold system where the cable ends would stay where positioned as the operator proceeds with the welding operation. It can be seen that it would be highly advantageous to provide a mold system for electrical or earthing connections and the like which would readily accommodate different size cabling without the use of packing, adapter sleeves or shims. It would also be desirable for the mold systems to maintain the weld chamber well vented to atmosphere.

It would also be advantageous to provide a single use lower cost mold system for electrical or earthing connections. A desirable system would provide fewer single use mold types and sizes while at the same time expand the application of the easier to use, and in some cases more economical to use, single use molds. It would also be advantageous if the single use mold did not include an integral crucible which adds to the cost, but rather be designed in its many applications and sizes to interfit with a single type of reusable crucible.

SUMMARY OF THE INVENTION

A single use mold system for joining conductors such as cables to each other and to other parts such as bus bar, laminates, reinforcing rods, both vertical and horizontal ground rods, or vertical metal surfaces, for example, is formed of a frangible refractory body. The mold body includes a weld chamber. Exothermic welding material in a crucible above forms molten metal which drops into the weld chamber through a tap hole or open top. The mold body includes tubular metal sleeving guides forming passages extending upwardly at an angle from horizontal with the upper projecting end of such guides beyond the body being above the level of molten metal forming the weld. The frangible refractory part fits closely around the exterior of the guides. In this manner, the molten metal is contained within the weld cavity of the mold even though no packing, adapter sleeves or shims are employed.

The sleeving passages formed by the guides extend upwardly at an angle from the weld chamber, or as a V with two symmetrical passages. The passages are larger than normal passages and accordingly will accommodate a wide variety of cable sizes without interference. This enables one mold to accommodate more sizes and still avoids the use of packing, adapter sleeves or shims, and also maintains the weld chamber well vented. For a two, three or more cable connection, the mold system results in a two, three or more dimension V connection, joined at the intersection by the weld metal.

The installation and operation of the parts are greatly simplified. The mold is ready to receive the conductor ends when properly positioned. The ends are simply inserted in the inclined sleeving guide passages until they abut the weld chamber or other cable inserted from another sleeving passage. They are inserted to a physical stop. The cables may be bent a short distance from their ends, and in effect hooked into the inclined sleeving guide passages. This holds the cable in place while the operator may position a crucible on top of the mold and the top of the mold may have a special recessed seat for a crucible nozzle. The oversize sleeve guides prevent thermal shock protecting annealed cable ends. The guide sleeves also prevent the weld chamber from being sealed.

The inside diameter of the guide sleeves is larger than the accommodated cable or conductor and will receive a variety of different diameters, each with clearance. For example, one size or type of a single use mold may accommodate conductors from about 16 to about 50 mm$^2$, or more. Other sizes and types may accommodate a wide range of sizes up to 120 mm$^2$, or more.

DETAILED DESCRIPTION OF THE PREFERRED EMBODIMENTS

Figure 1:
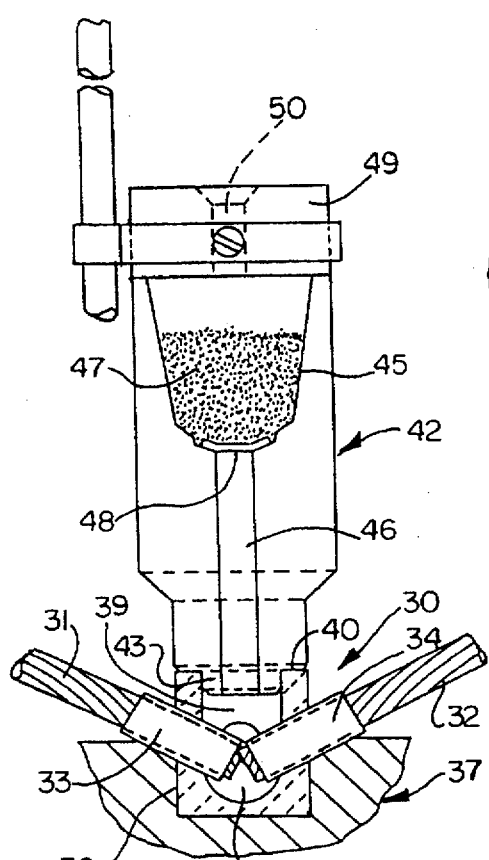
FIG. 1 is a fragmentary vertical section of one type of mold in accordance with the present invention, supported by a fixture with cable ends in place and a crucible on top.

Referring initially to FIG. 1, there is illustrated a single use mold shown generally at 30 for forming conductor-to-conductor welded connections. The conductors illustrated are in the form of stranded cable such as seen at 31 and 32 with the ends to be joined entering the mold through inclined projecting guide sleeves 33 and 34, respectively, the ends projecting into the weld chamber 35. The single use mold is supported in a recess 36 in a base plate or fixture 37.

The open top 39 of the mold forms a projecting annular rim 40 and a crucible assembly shown generally at 42 may be positioned on top of the mold when supported on the fixture. The crucible assembly includes a downwardly projecting nozzle 43 which projects into the open top 39 and includes a shoulder around the nozzle with seats on the mold rim 40. In this manner the crucible is supported by the mold in its upright position illustrated in FIG. 1.

The crucible is shown in more detail in applicant's co-pending provisional application entitled "Exothermic Welding Crucible and Method", Ser. No. 60/015,559, filed Apr. 18, 1996, now abandoned in favor or regular U.S. application filed Apr. 14, 1997, Ser. No. 08/843,263. The crucible is formed of refractory blocks, one of which is illustrated. The blocks mate on a parting plane which is the same as the plane of FIG. 1. The faces of the blocks which form the parting plane have recesses which form a reaction chamber 45 and a vertically extending sprue or tap hole 46. The reaction chamber includes a charge of exothermic material seen at 47 supported on steel discs 48 at the shoulder between the reaction chamber and tap hole.

The reaction chamber is closed by a lid 49 which may include a funnel hole 50 through which starting powder is introduced to the top of the exothermic material and through which ignition may be achieved by a flint gun, for example. When ignited, the exothermic material produces a reaction forming a molten metal which drops through the sprue hole 47 46 when the disc 48 is fused. The molten metal drops into the weld chamber 35 forming a high ampacity, low resistance electrical connection between the cables 31 and 32. The crucible and fixtures may then be removed and the single purpose mold may be left in place or broken away. The mold is made of a frangible refractory material and is not intended to be used again to form additional connections as are conventional reusable graphite molds, for example.

Figure 3:
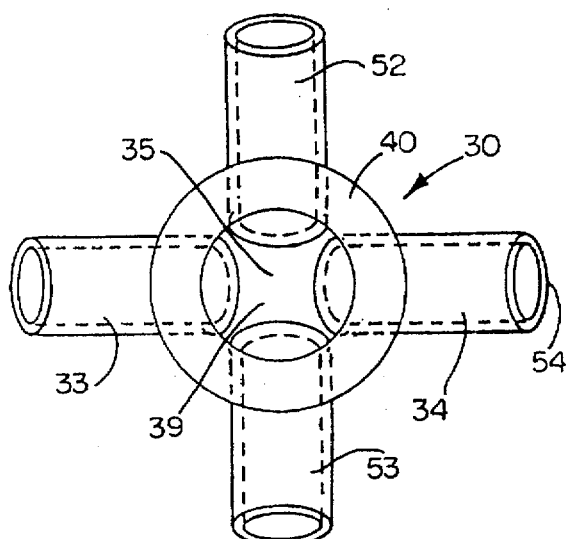
FIG. 3 is a top plane view of the mold of FIG. 2 as seen substantially from the line 2—2 thereof.
Figure 2:
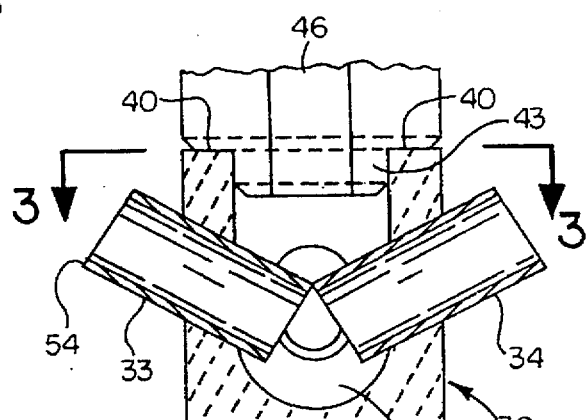
FIG. 2 is an enlarged vertical section of the mold without the cable ends in place.

Referring now additionally to FIGS. 2 and 3, it will be seen that the single use refractory frangible mold 30 may include four quadrant spaced guide sleeves projecting from the refractory body. The guide sleeves are shown as reading clockwise at 33, 52, 34 and 53. It will be noted that each extends from inside the weld chamber 35 to the exterior of the refractory body portion of the mold projecting a substantial distance. The angle of inclination from the horizontal and the projection distance is such as to ensure that the outer lip or edge of the guide sleeves at 54 is above the molten metal within the weld chamber during the welding process. This avoids the problem of leakage.

Figure 4:
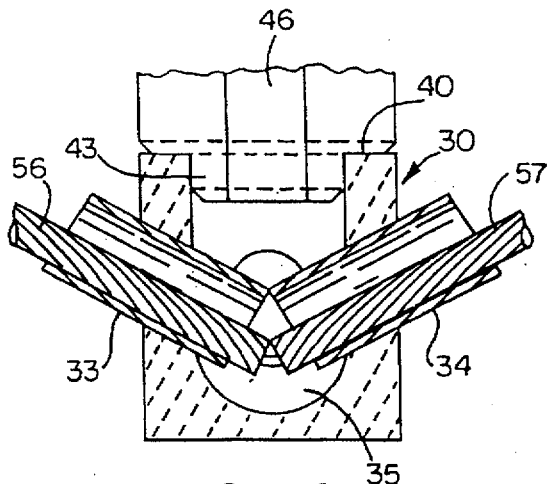
FIG. 4 is a view like FIG. 2 with two smaller cable ends in place.
Figure 5:
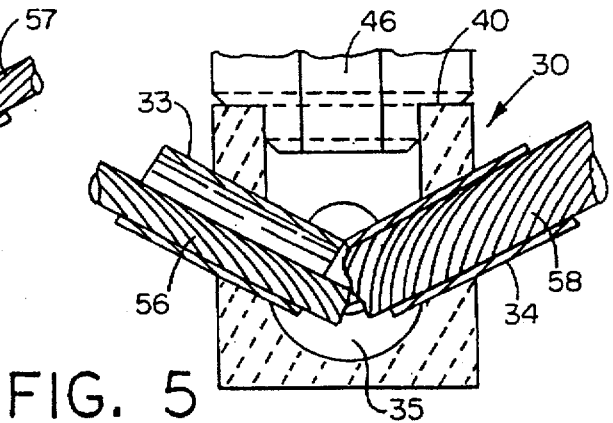
FIG. 5 is a view like FIG. 2 with one smaller and one larger cable end.

The inside diameter of the guide sleeves is selected to be larger than the largest conductor or cable designed to be used with the mold. For example, a single type or size of mold may accommodate a wide range of sizes of conductor. FIG. 4 illustrates two relatively small cables indicated at 56 and 57 inserted into the inclined guide sleeves. The clearance between the inside diameter of the sleeves and the smaller cables 56 and 57 is readily apparent. However, even with the larger cable 58 seen in FIG. 5, a significant amount of clearance is still provided so that the weld chamber is always well vented. The refractory material is pressed or secured tightly around the outside of the guide sleeves so that the single purpose mold illustrated is actually a combination or composite of a refractory body with the inclined projecting metal guide sleeves. The guide sleeves may, for example, be either copper or steel.

With the mold illustrated, up to four cable ends may be welded to each other each at the inclined angle illustrated forming in effect two right angle Vs with the weld metal at the intersections. The same mold will of course weld two cables, generally aligned or at right angles to each other with the guide sleeves not used simply left empty. It will also connect three cables in the form of a T.

The frangible refractory body may be formed of a variety of materials such as shown in the noted prior Gelfand U.S. Pat. No. 3,020,608. These refractory materials may, for example, include fired clays, sand molds, bonded calcined dolomite, graphite molds, or refractory glass. Sand molds may be formed in a variety of ways as in foundry mold or core processes. These may include a variety of binder systems and include no-bake, heat cured, and cold box binder systems. In the no-bake and cold box processes, the binder is cured at room temperature.

An exemplary sand-binder system formulation may be:

2.9% binder (phenol formol and 10% hexamenthylene tetranine)

8% iron oxide 89.1% sand.

Other resin binder processes and materials which are useful may be seen in the article entitled "Resin Binder Processes" by Messrs. Archibald and Smith of the Ashland Chemical Company appearing on pages 214 through 221 of the ASM Metals Handbook®, Ninth Edition, Volume 15, entitled "CASTING". The Metals Handbook® is published by ASM International of Metals Park, Ohio, USA, 44073.

Figure 6:
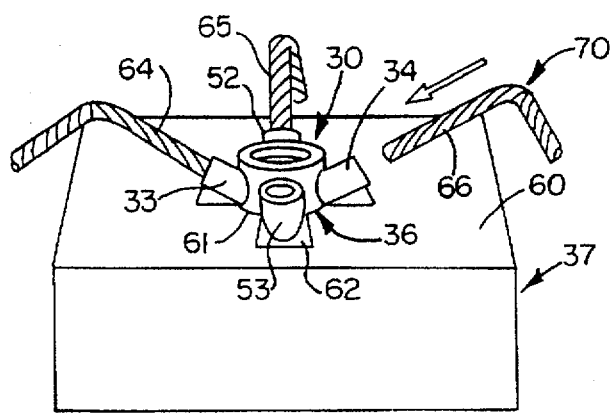
FIG. 6 is a perspective view on a reduced scale of how cables can be positioned in a mold supported by the fixture.
Figure 7:
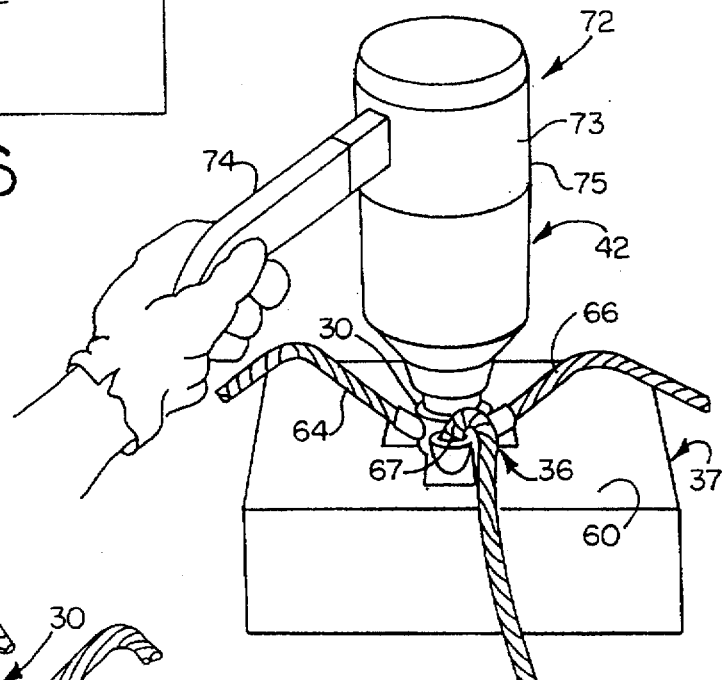
FIG. 7 is a similar view showing the crucible in place.
Figure 8:
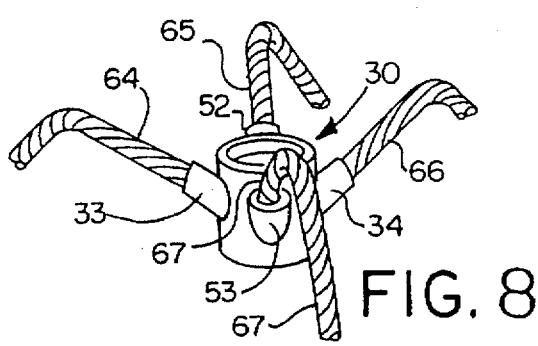
FIG. 8 is a view of the connection made with the mold and process of FIGS. 1–7.
Figure 9:
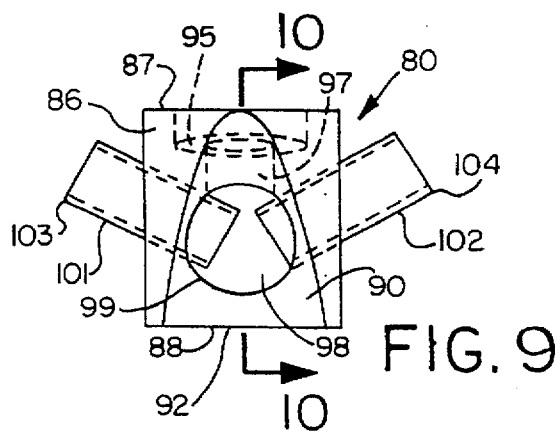
FIG. 9 is an elevation of another type mold in accordance with the present invention.
Figure 10:
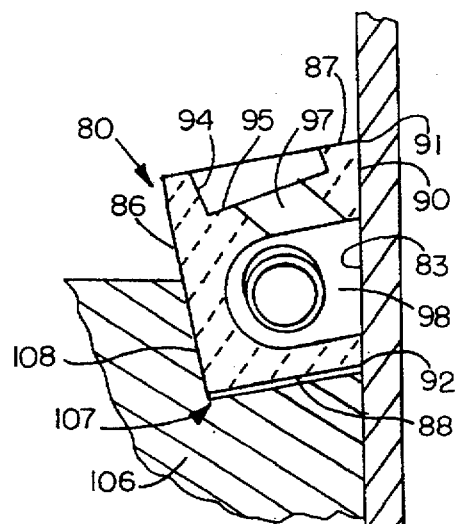
FIG. 10 is a vertical section through such mold as seen from the line 10—10 of FIG. 9 supported by a fixture for welding conductors to a vertical steel surface.

Referring now to FIGS. 6, 7 and 8, there is illustrated the process of use of the single purpose mold seen in FIGS. 1–5. The mold is positioned in recess 36 in the surface 60 of fixture 37. The fixture simply serves as a base plate holding the mold against movement while the operator inserts the cable ends and prepares and installs the crucible in the proper position. The recess 36 includes a center circular portion 61 and inclined quadrant spaced edge ramps 62 which accommodate the projecting inclined guide sleeves. Accordingly, when the single purpose mold 30 is positioned in the recess as shown, it is firmly supported by the fixture against horizontal movement and also supported against axial rotation because of the interfitting of the guide sleeves with the inclined ramps. When thus supported, the cable ends seen at 64, 65, 66 and 67 may be inserted in the respective guide sleeves.

It has been found that by bending the cable as indicated at 70 to form a slight hook, the cable ends can more readily be positioned into the guide sleeves as shown by the arrow and will stay where positioned. This enables the operator to insert the cable ends into a closed and positioned mold and enables the operator to insert the cable ends to a physical stop. The cable ends will either abut each other or the weld chamber. Because of the bend or hook-like configuration, the cables will stay in place without further support or awkward cable clamps.

As seen in FIG. 7, the crucible 42 is positioned on top of the single purpose mold 30. The charge of exothermic material is ignited by the igniter shown generally at 72 which include an integral hood 73 and a flint gun 74. The hood 73 includes a skirt 75 which telescopes over the top of the lid of the crucible seen in FIG. 1. The igniter reduces smoke and sparks which may result from the exothermic process.

The molten metal formed by the process fuses the disc inside the crucible and the molten metal flows down through the sprue hole of the crucible into the top of the single purpose mold 30 and into the weld chamber forming a high ampacity, low resistance electrical connection. The molten weld metal will also fuse the inner ends of the metal guide sleeves and such sleeves serve to protect annealed cable ends acting as heat sinks and avoiding thermal shock.

After the weld is made, the crucible is removed, cleaned and recharged. The electrical connection made is as shown in FIG. 8. At this point, the single purpose mold 30 may be left in place or it may be broken away.

Referring now to FIGS. 9–13, there is illustrated another type of single purpose molds shown generally at 80. The purpose of the mold 80 is to weld one or two conductors shown at 81 and 82 in FIGS. 12 and 13 to a vertical metal surface 83, which, as illustrated, may be the web of a steel column 84. While the mold 80 is in the form of a right circular cylindrical cup having an open top and a closed bottom, the mold 80 for the most part, has a body with an exterior surface 86 also in the form of a right circular cylinder. The top 87 and the bottom 88 of the mold are perpendicular to the axis of that cylindrical surface, and of course parallel to each other. The mold also includes an exterior flat secant surface 90 which starts essentially at one edge of the top 87 as seen at 91 and forms a chord 92 with the otherwise circular bottom 88. The surface 90 may extend at approximately 10° to the axis of the cylindrical surface 86.

The top of the mold is provided with a circular recess seen at 94 which terminates in an annular shoulder 95. The axis of the recess may be tilted approximately 10° from the axis of the cylindrical surface 86 and thus be about 80° from the plane of the top 87. Leading from the center of the recess 94 is an inclined tap hole 97 which leads to weld chamber 98. The axis of the tap hole 97 is approximately 30° from the axis of the cylindrical surface 86 and such axis is aimed at the approximate center of the somewhat elliptical opening 99 formed by the intersection of the weld chamber 98 and the secant surface 90. Entering the weld chamber are two inclined metal guide sleeves 101 and 102. The sleeves project sufficiently so that the outer lower edges indicated at 103 and 104, respectively, are above the weld metal. Like mold 30, the mold 80 is a composite with the body being a refractory material such as a fired clay, sand mold, or glass while the inclined projecting guide sleeves are metallic such as copper or steel.

Figure 11:
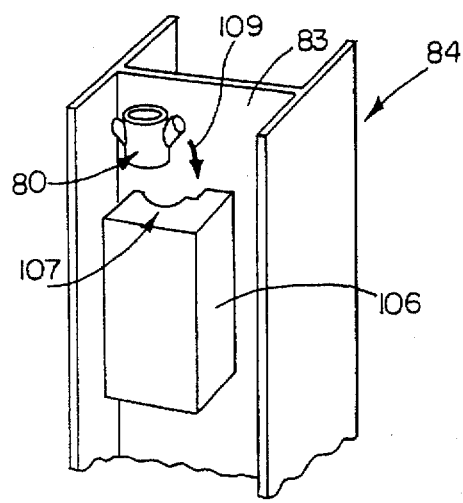
FIG. 11 is a fragmentary perspective on a reduced scale showing the fixture in place and the mold being inserted.
Figure 12:
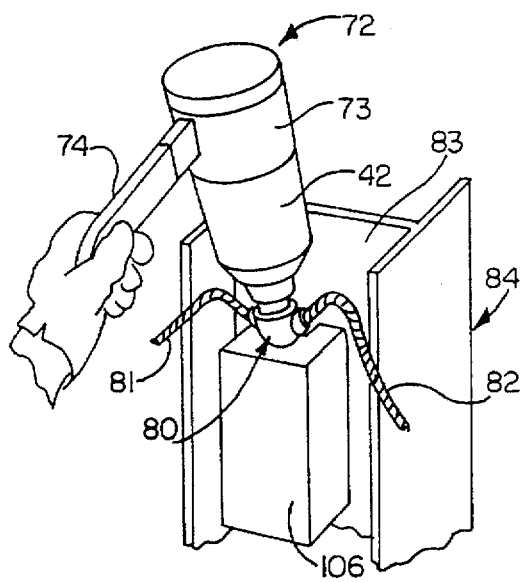
FIG. 12 is a similar view with the conductor ends in place and the crucible in position.
Figure 13:
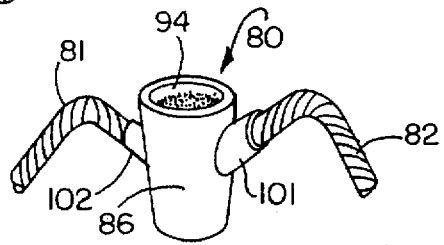
FIG. 13 is an illustration of the connection made with the mold and process of FIGS. 9–12.

Referring now additionally to FIGS. 11-13, it will be seen that the surface 83 to which the electrical connection is to be made may be provided with a magnetic fixture seen at 106 which may simply be a block of aluminum incorporating permanent magnets. The fixture is secured to the metal surface in the desired location and is provided with a notch 107 in the upper edge thereof. The notch seen more clearly in FIG. 10 includes a rear wedge surface 108 so that as the mold 80 is forced down into the notch 107 as indicated by the arrow 109 in FIG. 11, the secant surface will be forced by the wedge angle against the surface of the column web 83. After the cable ends 81 and 82 are inserted into the positioned mold as seen in FIG. 12, the crucible 42 may be positioned on top of the mold with the tip of the nozzle 43 coming to bear against the shoulder 95. The previously prepared charge in the crucible is ignited as seen in FIG. 12. In FIG. 13 the crucible and fixture have been removed leaving the two cable electrical connection illustrated on the face of the column web which is the background of the figure. Again, the refractory portion of the mold may be left in place or broken away.

Figure 14:
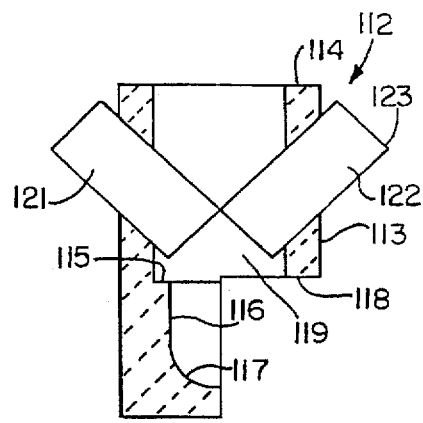
FIG. 14 is a vertical section through another type of mold in accordance with the present invention for welding conductors to the edge of laminate or bar.
Figure 15:
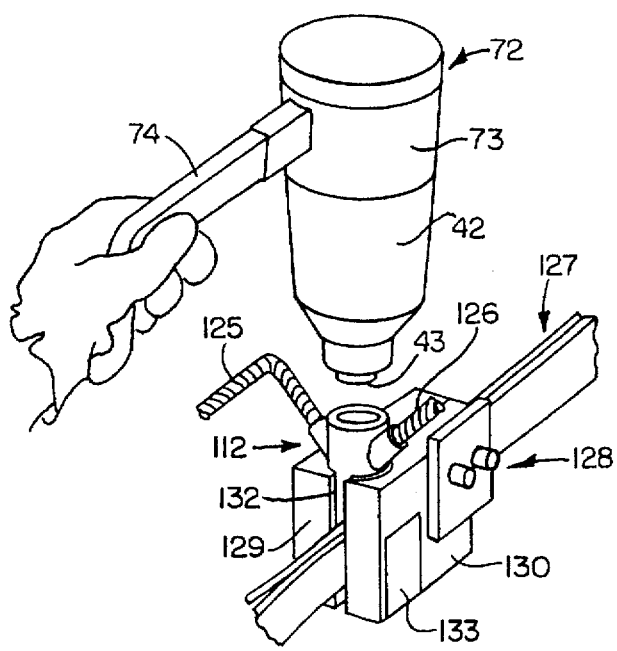
FIG. 15 is a fragmentary perspective on a reduced scale view showing the mold being assembled with a fixture and the crucible being positioned.
Figure 16:
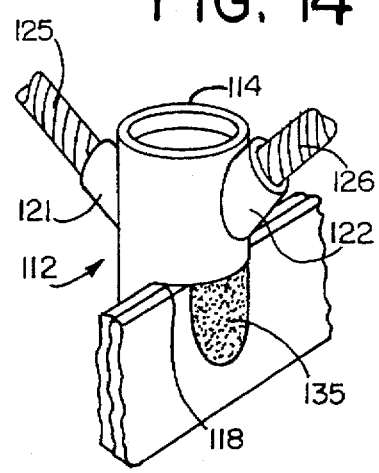
FIG. 16 is a somewhat enlarged view of the connection made with the mold of FIG. 14.

Referring now to FIGS. 14, 15 and 16, there is illustrated another type of single use mold shown at 112 for welding electric cable or other conductors to the edge of laminate or bus bar, for example. The mold 112 comprises a generally cylindrical refractory body 113 having an open top 114. Slightly below the mid point of the cylindrical mold, the interior is provided with a slight step seen at 115 and a reduced interior diameter lower section 116 tapers into a half-dome bottom 117. This configuration is exposed to a diametrical axial plane through the mold because the opposite side stops at a step 118 slightly above the opposite step 115. Accordingly, the entire lower half of the weld chamber is exposed both along the diameter and along the transverse step 118. The tubular metal guide sleeves extend into a weld chamber 119 at an inclined angle as seen at 121 and 122 with the outer projecting lower edge of each at 123 being above the level of molten metal within the weld chamber.

Referring now to FIGS. 15 and 16, it will be seen that cables 125 and 126 are to be welded to the edge of the laminate seen at 127. The mold is positioned in a two part fixture shown generally at 128 with the two parts 129 and 130 clamping the laminate transversely and forming a recess indicated at 132 to receive the mold 112. When properly seated in the recess, the step 118 of the mold will fit on top of the laminate edges as seen in FIG. 16. Since the overall laminate or bar thickness may be less than the half of the inside diameter of the weld chamber at the step, the clamp portion 130 is provided with a refractory insert 133 which has a recess like that seen at 116 and 117 facing the laminate face. Thus, the weld metal may run down both sides of the laminate edges and the portion of the weld being formed by the refractory insert 133 is shown at 135 in FIG. 16. With the clamp on the laminate, and the mold 112 in place, the cable ends 125 and 126 are inserted, and the previously prepared crucible is inserted on top of the mold as seen at 42 in FIG. 15 with the bottom nozzle 43 entering the open top of the mold. When the exothermic material is ignited, the molten metal formed will form the weld seen in FIG. 16. Again the single use mold 112 may be left in place as shown or broken away.

Figure 17:
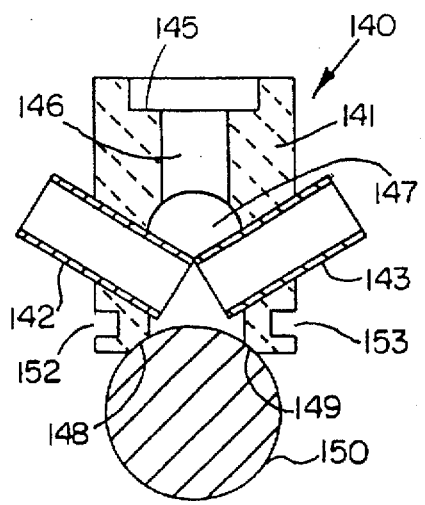
FIG. 17 is a vertical section through another type mold for making an electrical weld connection to round bar.

In FIG. 17, there is illustrated another type of single use mold shown generally at 140 which comprises a refractory body 141 and inclined metal projecting guide sleeves 142 and 143. The top of the mold is provided with a recessed seat 145 for the crucible nozzle 43 and a tap hole 146 leads to weld chamber 147 which is open at the bottom. The bottom of the mold adjacent the weld chamber opening may be provided with curved or beveled surfaces seen at 148 and 149 which permit the mold to seat on a rod 150. If the rod has irregular surfaces such as a concrete reinforcing bar, a fiberglass gasket may be employed surrounding the opening of the weld chamber to the rod 150. The exterior of the mold is provided with slots seen at 152 and 153 adapted to interfit with the tines of a fixture holding the mold to the bar. If the bar is vertical, a mold like the mold 80 may be employed but with a curved secant surface corresponding generally to the curved surface of the bar. In any event, the mold may be clamped to the bar, the cable inserted through the oversized sleeving 142 and 143 with the crucible then seated in the top of the single use mold. The exothermic material when ignited flows into the mold to form an electrical connection between one or two conductors or cable and the rod 150.

Figure 18:
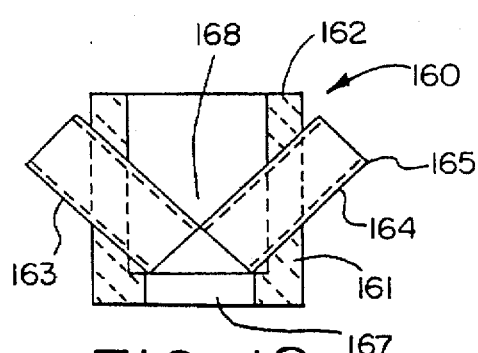
FIG. 18 is a vertical section through yet another type mold for welding two conductors to an earthing plate or receptacle.
Figure 19:
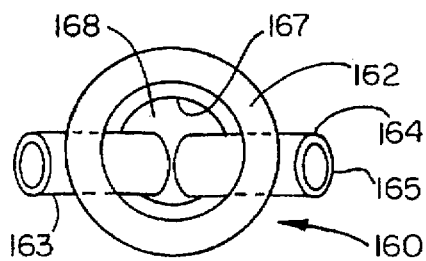
FIG. 19 is a top plan view of the mold seen in FIG. 18.

FIGS. 18 and 19 illustrate yet another type of mold shown generally at 160. The mold 160 includes a refractory cylindrical cup-shape body 1 61 having a top rim 162. Projecting through the cylindrical body are the two metal guide sleeves 163 and 164, the inclination and extent of which is such that the upper outer lower edge of each seen at 165 is above the weld metal. The open top with the rim 162 accommodates the nozzle of the crucible while the bottom is provided with a hole indicated at 167. The hole 167 in effect forms the bottom of the weld chamber 168. As seen in FIG. 19, the sleeving passages formed by the guide sleeves 163 and 164 are slightly offset from the center of the mold so that the molten metal will not impinge directly on the cable ends and guide sleeving so that the molten metal will not prematurely cool.

Figure 20:
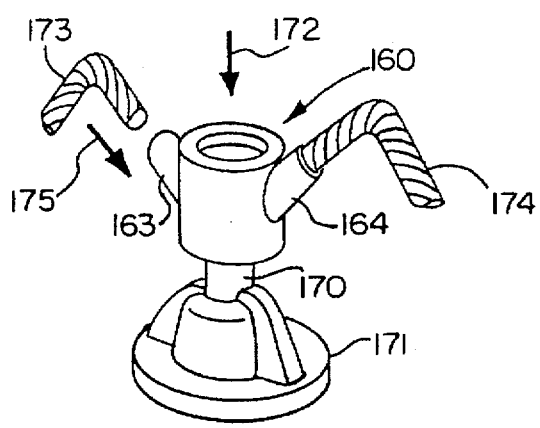
FIG. 20 illustrates the mold and conductors being assembled to an earthing plate.
Figure 21:
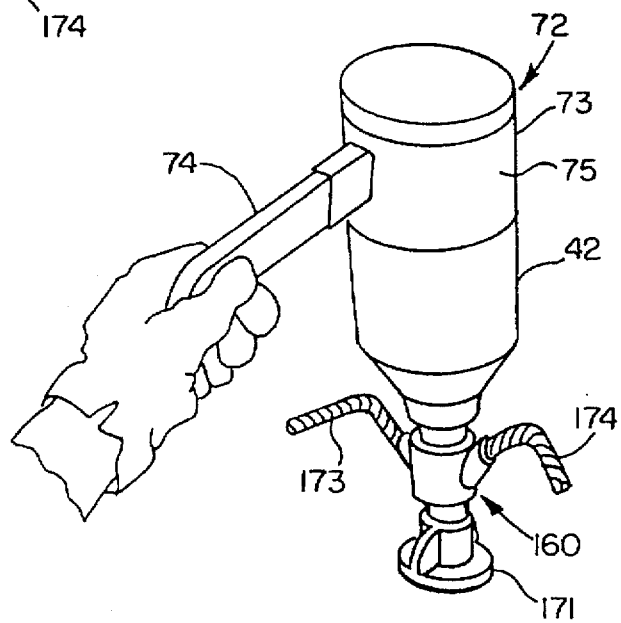
FIG. 21 illustrates on a reduced scale the crucible being assembled to the mold of FIGS. 18–20.

The mold 160 of FIGS. 18 and 19 is designed to be inserted on the stud 170 of a grounding plate 171 shown inverted in FIG. 20. When the mold is inserted on the stud 170 as indicated by the arrow 172, the end of the stud enters the opening 167 and closes the bottom of the weld chamber. The cables 173 and 174 are inserted in the mold as indicated by the arrow 175. The mold is then ready for positioning of the crucible as seen in FIG. 21 and the igniter 74 will ignite the prepared charge permitting the molten metal to form and enter the weld chamber welding the conductors 173 and 174 to the ground plate 171.

Figure 22:
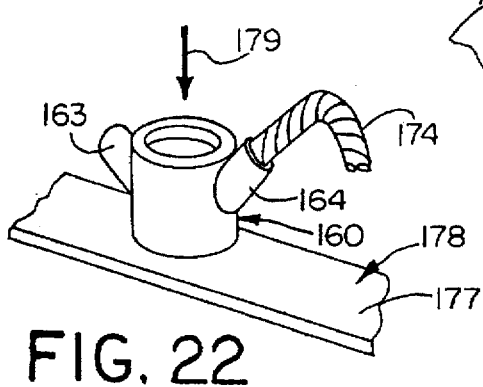
FIG. 22 illustrates the same mold applied to the face of laminate or bus bar for making a connection to the face thereof.

Because of the hole 167 in the bottom of the mold exposing the weld chamber, the mold 160 may also be employed to weld conductors or cable to the flat face of horizontal bar or laminate. As seen in FIG. 22, the mold is positioned onto the face 177 of laminate or bar 178, as indicated by the arrow 179. After one or both cables or conductors are positioned as seen, the crucible 42 previously filled with the welding metal composition, is mounted on the mold with the nozzle entering the top. The igniter is then used to create the exothermic reaction with the molten metal entering the mold and welding one or both conductors to the face of the laminate or bar.

It can now be seen that there is provided a single use welding mold and method greatly facilitating a wide variety of electrical high ampacity low resistance electrical connections.

To the accomplishment of the foregoing and related ends, the invention then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

I claim:

1. A refractory single use mold for forming electrical connections including a weld chamber having a tap hole at the top and a tubular metal guide sleeve adapted to receive a conductor end to be welded projecting from the mold at such angle and distance to contain molten metal in the weld chamber.

2. A mold as set forth in claim 1 wherein said mold is a frangible one piece refractory mold.

3. A mold as set forth in claim 1 wherein said mold includes an opening to the weld chamber to be closed by a part to which the conductor is to be welded.

4. A mold as set forth in claim 3 wherein said opening is in the bottom of the mold.

5. A mold as set forth in claim 3 wherein said opening is in a side wall of the mold.

6. A mold as set forth in claim 3 wherein said mold is generally cylindrical, and said opening is in a secant surface of the mold.

7. A mold as set forth in claim 3 wherein said mold is generally cylindrical and includes two projecting inclined guide sleeves substantially diametrically opposite each other.

8. A mold as set forth in claim 7 including four such projecting inclined sleeves quadrant spaced.

9. A single use mold for forming welded electrical connections comprising a refractory body forming a weld chamber, and at least one sleeving guide extending outwardly from said body into which a part to be welded is inserted for welding in said chamber, said sleeving guide extending upwardly at an angle to horizontal.

10. A mold as set forth in claim 9 wherein said mold is a material composite with the body being refractory and said sleeving guide being metal.

11. A mold as set forth in claim 10 including at least two sleeving guides, and a notch or surface having an opening exposed to the weld chamber.

12. A mold as set forth in claim 10 wherein said body is substantially cylindrical and has at least two sleeving guides generally opposite each other.

13. A mold as set forth in claim 12 wherein said body has four sleeving guides substantially quadrant spaced around the cylindrical body.

14. A mold as set forth in claim 12 wherein said body has a surface adapted to be held against a metal object, and an opening in said surface also an opening in the weld chamber whereby part of the metal object is exposed to the weld chamber.

15. A mold as set forth in claim 14 wherein said surface is the bottom surface of the mold.

16. A mold as set forth in claim 15 wherein said bottom surface is curved to fit a curved metal object.

17. A mold as set forth in claim 14 wherein said opening is designed to receive the metal object in telescoping fashion.

18. A mold as set forth in claim 14 wherein said surface is a secant surface extending at an angle to the axis of the body.

19. A mold as set forth in claim 18 wherein said secant surface is flat.

20. A mold as set forth in claim 18 wherein said secant surface is curved.

21. A mold as set forth in claim 18 wherein said angle is a wedge angle whereby the mold may be wedged against such metal object.

22. A mold as set forth in claim 14 including a notch in the body to receive the metal object, said surface being in said notch.

23. A mold as set forth in claim 15 including a notch in the exterior of the body to facilitate positioning the body in a jig.

24. A method of forming an electrical connection comprising the steps of forming a frangible refractory mold having a weld chamber with a tap hole at the top, and one or more metal sleeving passages entering the weld chamber and extending beyond the exterior of the mold, said metal sleeving passages being adapted to receive the ends of conductors to be welded in such chamber, and inclining the angle of projection of such metal sleeving passages so that the outer end is above any molten metal in the weld chamber during the welding process, introducing conductors to be welded through said metal sleeves into the weld chamber, and introducing molten metal into such weld chamber through said tap hole to form the electrical connection.

25. A method as set forth in claim 24 including the step of maintaining the weld chamber vented through the interior of the sleeves during the introduction of molten metal.

26. A method as set forth in claim 24 including the step of exposing the weld chamber to a metal object to weld the conductors to the object.

27. A method as set forth in 26 including the step of clamping the mold to the metal object with a fixture.

28. A method as set forth in claim 24 including the step of hooking the ends of the conductors before inserting in the respective sleeving passages.

29. A method as set forth in claim 24 including inserting the conductor ends to a physical stop.

30. A method as set forth in claim 24 including the step of forming the mold body as a cylinder and providing at least two inclined sleeving passages generally diametrical opposite each other.

31. A method as set forth in claim 30 including providing four quadrant spaced sleeving passages.

32. A method as set forth in claim 24 including the step of utilizing a reusable crucible to introduce the molten metal, said crucible including an nozzle interfitting the mold.

* * * * *